United States Patent [19]

Bland

[11] Patent Number: 4,533,331

[45] Date of Patent: Aug. 6, 1985

[54] VENT AND DRAIN ASSEMBLY FOR MARINE PROPULSION DEVICE

[75] Inventor: Gerald F. Bland, Kenosha, Wis.

[73] Assignee: Outboard Marine Corporation, Waukegan, Ill.

[21] Appl. No.: 551,158

[22] Filed: Nov. 14, 1983

Related U.S. Application Data

[63] Continuation of Ser. No. 338,333, Jan. 11, 1982, abandoned.

[51] Int. Cl.[3] ...................... B63H 21/26; F16K 31/22

[52] U.S. Cl. ........................................ 440/88; 440/77; 440/900; 114/197

[58] Field of Search ..................... 440/77, 88, 89, 900; 114/182, 197, 198; 137/433, 388, 197, 199, 216, 216.1, 216.2, 217, 430; 4/205; 215/260, 270, 307, 310, 311, 355

[56] References Cited

U.S. PATENT DOCUMENTS 2,367,718 1/1945 Farrell .................................. 114/97

3,570,465 3/1971 Masaoka .............................. 440/77

4,088,149 5/1978 Logsdon ............................ 137/433

FOREIGN PATENT DOCUMENTS 55-83696 6/1980 Japan .................................. 440/900

*Primary Examiner*—Trygve M. Blix

*Assistant Examiner*—Rodney Corl

*Attorney, Agent, or Firm*—Michael, Best & Friedrich

[57] ABSTRACT

The outboard motor includes a powerhead shroud defining an engine compartment for an internal combustion engine and a vent and drain assembly for ventilating the engine compartment to the atmosphere and for draining liquids, such as water, from the engine compartment. The vent and drain assembly includes a valve member movably disposed in an aperture at a low point in the bottom wall of the powerhead shroud opening the engine compartment to the atmosphere. The valve member includes a domed portion which extends through the aperture and defines a cavity for entrapped air and an annular sealing flange which is located exteriorly of the shroud bottom wall. The valve member is held by gravity in an open position wherein the sealing flange is displaced outwardly from the shroud bottom wall for ventilation and draining and is moved to a closed position wherein the sealing flange is in sealing engagement with the shroud bottom wall in response to a rise in the water level above the shroud bottom wall.

13 Claims, 5 Drawing Figures

VENT AND DRAIN ASSEMBLY FOR MARINE PROPULSION DEVICE

This is a continuation of application Ser. No. 338,333 filed Jan. 11. 1982, now abandoned.

BACKGROUND OF THE INVENTION

This invention relates to marine propulsion devices and, more particularly, to marine propulsion devices having a powerhead carried aft of the boat transom in both the upright and tilted positions.

Outboard motors typically include a powerhead shroud or housing defining a engine compartment for an internal combustion engine. This powerhead shroud normally includes one or more openings for ventilating the engine compartment and/or for draining liquids from the engine compartment. These openings can permit entry of water into the engine compartment during heavy rain or heavy wave conditions.

The powerhead shroud for outboard motors carried wholly aft of the boat transom usually is somewhat closer to the water. Consequently, there is greater possibility of water entering in the engine compartment through these openings during heavy wave conditions. Means capable of ventilating the engine compartment to the atmosphere, but preventing water from entering the engine compartment under high water conditions is desirable. It is desirable for such means to also be capable of serving as a drain for draining water and the like from the engine compartment.

Attention is directed to the following U.S. patents relating to vent arrangements for applications other than in marine propulsion devices:

| PATENTEE | U.S. PAT. NO. | ISSUE DATE |
|---|---|---|
| Lombard | 2,528,600 | November 7, 1950 |
| Pfrengle | 3,614,960 | October 26, 1971 |
| Bogdanski | 3,620,240 | November 16, 1971 |
| Dragon et al | 3,662,725 | May 16, 1972 |
| Smallwood | 3,736,950 | June 5, 1973 |
| Davis | 3,770,001 | November 6, 1973 |

Attention is also directed to co-pending application Ser. No. 349,177, filed Feb. 16, 1982, and assigned to the assignee of the present application, relating to a vent assembly for marine propulsion devices.

SUMMARY OF THE INVENTION

The invention provides a marine propulsion device comprising a propulsion assembly including a lower unit having a gear case normally submerged in water and carrying a rotatably mounted propeller, an upper unit including a powerhead shroud normally located above the water and defining an engine compartment for an internal combustion engine, and a vent and drain assembly for ventilating and draining the engine compartment to the atmosphere. The vent and drain assembly includes a valve member movably disposed in an aperture which is located in a bottom wall of the powerhead shroud and which opens the engine compartment to the atmosphere. The valve member is operable to permit ventilation of the engine compartment to the atmosphere through the aperture and afford drainage of liquids from the engine compartment when the shroud bottomm wall is above the water and also operable to prevent the ingress of water into the engine compartment through the aperture in response to a rise in the water level above the shroud bottom wall.

In one embodiment, the valve member includes a sealing portion which is disposed exteriorly of the shroud bottom wall, is adapted to sealingly engage the outer surface of the shroud bottom wall in the vicinity of the vent and drain aperture, and is displaced outwardly from the shroud bottom wall when the valve member is in the open position.

In one embodiment, the valve member includes a domed portion which defines a cavity for entrapped air, extends through the vent and drain aperture and has an outer end portion. The sealing portion is an annular flange extending laterally or radially outwardly from the outer end portion of the domed portion. The valve member is held by gravity in the open position with circumferentially spaced lugs extending radially outwardly from the domed portion resting on the inner surface of the shroud bottom wall adjacent the vent and drain aperture.

In one embodiment, the cavity defined by the domed portion is open to the atmosphere and air is entrapped therein as the water level rises above the shroud bottom wall, causing the valve member to be lifted or moved upwardly to the closed position. In an alternate embodiment, the domed portion is covered by a diaphragm or wall member to define a closed or substantially closed chamber for entrapped air.

One of the principal features of the invention is the provision of a marine propulsion device including a propulsion assembly having a powerhead shroud defining an engine compartment for an internal combustion engine and a vent and drain assembly for ventilating and draining the engine compartment under normal conditions and for preventing water from entering the engine compartment when the water level is above the lower portion of the powerhead shroud.

Another of the principal features of the invention is the provision of such a marine propulsion device including such a vent and drain assembly which is arranged to provide positive sealing and to prevent water from readily splashing into the engine compartment when in the open position.

A further of the principal features of the invention is the provision of such a marine propulsion device including such a vent and drain assembly which is simply constructed and can be conveniently assembled and installed.

Other features, aspects and advantages of the invention will become apparent to those skilled in the art upon reviewing the following detailed description, the drawing and the appended claims.

Figure 1:
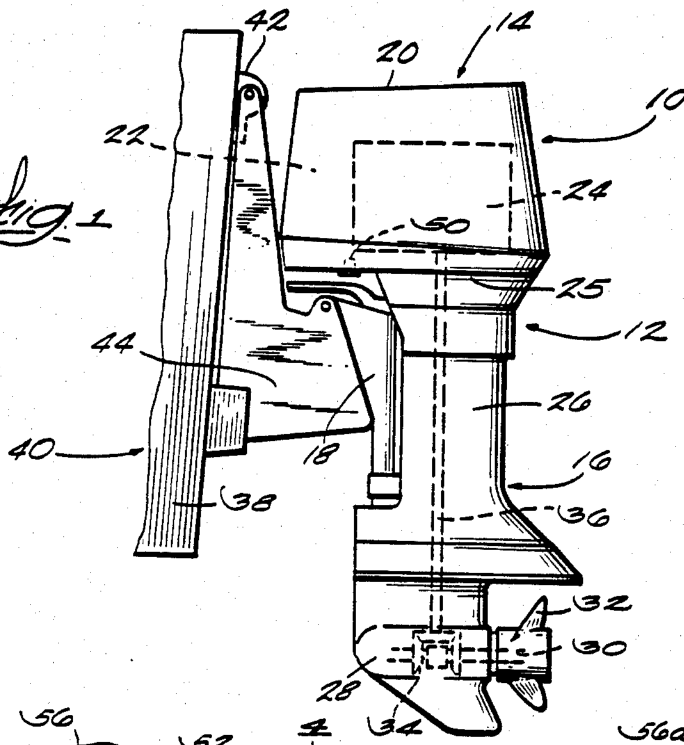
FIG. 1 is a side elevational view of an outboard motor embodying various of the features of the invention, shown mounted on a boat transom.

Before explaining at least one of the embodiments of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF THE PREFERRED EMBODIMENT

Illustrated in FIG. 1 is a marine propulsion device in the form of an outboard motor 10 having a propulsion assembly 12 including an upper unit or powerhead 14, a lower unit 16 and a swivel bracket 18. The powerhead 14 includes a cover or shroud 20 defining an engine compartment 22 for an internal combustion engine 24. The powerhead shroud 20 has a bottom wall 25 which is situated above the water under normal conditions.

The lower unit 16 is rigidly mounted to the bottom of the powerhead 14 and includes a driveshaft housing 26 and a gear case 28. The gear case 28 is submerged in water during normal operation and supports a rotatable propeller shaft 30 carrying a propeller 32. The gear case 28 houses a suitable reversing transmission 34 which drivingly connects the propeller 32 to a driveshaft 36 extending through the driveshaft housing 26 and drivingly connected to the engine 24.

The lower unit 16 is connected to the swivel bracket 18 for swinging movement in a horizontal plane to provide steering control of the propulsion assembly 12. The propulsion assembly 12 is supported from the transom 38 or other supporting member of a boat hull 40 by a transom bracket 42 and an intermediate or stern bracket 44 on which the swivel bracket 18 is mounted. The stern bracket 44 is connected to the transom bracket 42 for pivotal or tilting movement of the propulsion assembly 12, including the swivel bracket 18, in a vertical plane between the illustrated operating position wherein the gear case 28 and the propeller 32 are fully submerged in the water and a tilted or non-operating position wherein the gear case 28 and the propeller 32 are raised from the water. The powerhead 14 remains aft of the boat transom 38 when the propulsion assembly 12 is in the non-operating position.

Provided in the bottom wall 25 of the powerhead shroud 20 is a vent and drain assembly 50 which is operable to permit ventilation of the engine compartment 22 to the atmosphere and to afford drainage of liquids from the engine compartment 22 when the water level is below the shroud bottom wall 25 and also operable to prevent water from entering the engine compartment 22 through a vent and drain opening in response to a rise in the water level above the housing bottom wall 25. More specifically, in the embodiment illustrated in FIGS. 1–4, the vent and drain assembly 50 includes a valve member 52 movably disposed in a circular opening or aperture 54 located at a low point in the shroud bottom wall 25. The valve member 52 includes a hollow, domed portion 56 having a circular cross section and an outer end portion 56. The domed portion 56 extends through the aperture 54 into the engine compartment 22 and defines a cavity 58 for entrapped air as explained in more detail below.

Disposed externally of the shroud bottom wall 25 and extending laterally or radially outwardly from the outer end portion 59 of the domed portion 56 is an annular flange 60 which is arranged to sealingly engage the outer surface of the shroud bottom wall 25 in the vicinity of the aperture 54. The valve member 52 also includes a plurality (e.g., 3) of circumferentially spaced ribs or lugs 62 which extend laterally or radially outwardly from the outer surface 64 of the domed portion 56 and are arranged to rest on the surface 66 of the shroud bottom wall 25 adjacent to the aperture 54.

Figure 2:
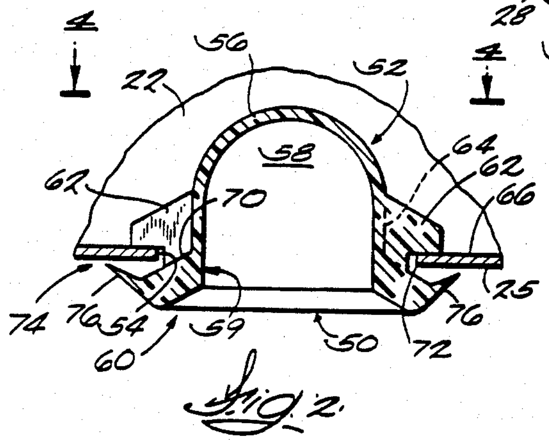
FIG. 2 is an enlarged, fragmentary view of the vent and drain assembly of the outboard motor of FIG. 1 with the vent and drain assembly in the open position.
Figure 5:
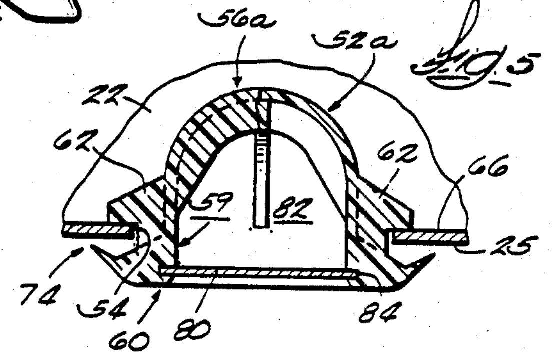
FIG. 5 is an enlarged, fragmentary view of an alternate arrangement for the vent and drain assembly.

When the water level is below the shroud bottom wall 25, the valve member 52 is held by gravity in an open position with the lugs 62 resting on the inner surface in 66 of the shroud bottom wall 25 and the flange 60 displaced outwardly from the shroud bottom wall 25 as illustrated in FIG. 2. When the valve member 52 is in the open position, air can flow into and out of the engine compartment 22 through (FIG. 4) passages 68, 70 and 72 defined between the domed portion 56, the aperture 54 and the inner surface of the flange 60. Also, any liquid present in the engine compartment, such as water, can drain therefrom through the passages 78, 70 and 72. For the vent and drain assembly 50 to best serve as a liquid drain, the aperture 54 preferably is located at a lowermost point in the shroud bottom wall 25.

Figure 3:
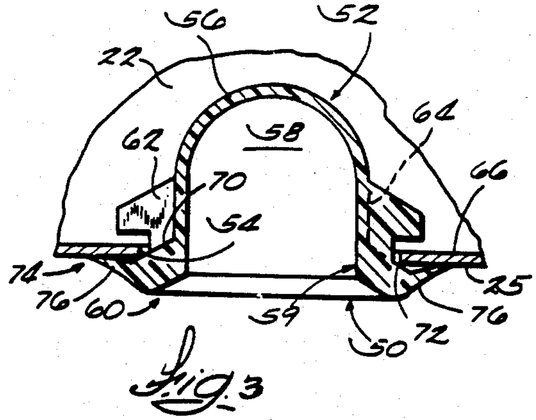
FIG. 3 is a view similar to FIG. 2 with the vent and drain assembly in the closed position.

In the event there is a rise in the water level above the shroud bottom wall 25 for some reason, air becomes entrapped in the cavity 58, causing the valve member 52 to be lifted or moved upwardly until the flange 60 sealingly engages the outer surface of the shroud bottom wall 25. To enhance sealing, the inner surface of the flange 60 preferably is provided with two sealing sections. A first sealing section of the flange 60 comprises a tapered surface 70 adjacent to the outer end portion 59 of the domed portion 56. The tapered surface 70 engages the outer rim or edge 72 of the aperture 54 when the valve member 52 is in the closed position as illustrated in FIG. 3. The second sealing section of the flange 60 comprises an annular peripheral lip 74 which is spaced radially outwardly from the tapered surface 70 and sealingly engages the outer surface of the shroud bottom wall 25 at a location beyond the aperture 54.

The outer surface 76 of the peripheral lip 74 can be tapered or flared toward the shroud bottom wall 25 so as to serve as a splash guard against water readily splashing through the flow passages 78, 70 and 72 into the engine compartment 22 when the valve member 52 is in the open position.

The valve member 52 preferably is made from a resilient material, such as rubber or the like, so that it can be snapped into the aperture 54 and the peripheral lip 74 can be deflected into sealingly engagement with the shroud bottom wall 25 in response to a relatively small lifting force acting on the valve member 52.

Figure 4:
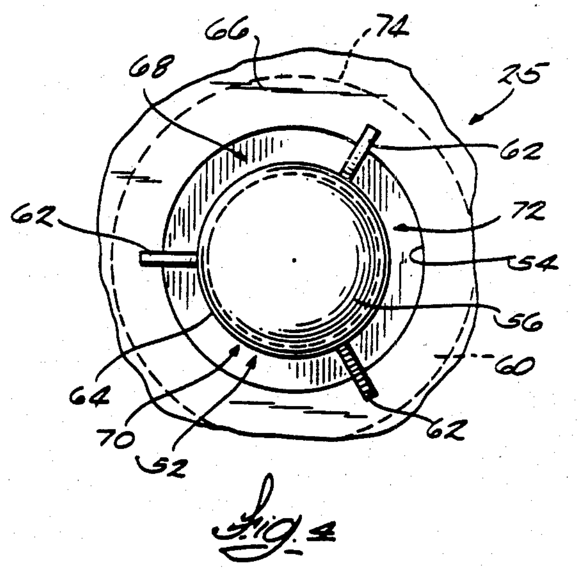
FIG. 4 is a sectional view taken generally along line 4—4 in FIG. 2.

In the alternative construction illustrated in FIG. 4, the domed portion **56*a* of the valve member 52*a* is covered by a wall member or diaphragm 80 extending laterally across the outer end portion 59 of the domed portion 52*a*. The diaphragm 80 cooperates with the domed portion 56*a* to define a closed, or substantially closed, chamber 82 for entrapped air. The diaphragm 80 prevents water from splashing into the chamber 82 and forcing out entrapped air which could cause the valve member 52*a*** not to be lifted or moved upwardly to the closed position upon being submerged in water.

The diaphragm 80 can be solid as shown or include a small vent opening (not shown) through which only a small amount of water can enter and drain from the chamber 82. The diaphragm 80 can be made from a relatively rigid material, such a thin plastic or metal disc, and snapped into a groove 84 in the outer end portion 59 of the domed portion 56*a* as illustrated in FIG. 4. Alternatively, the diaphragm 80 can be made from a more resilient material, such a rubber, and permanently bonded onto the open end portion 59 of the domed portion 56*a* with a suitable adhesive or the like.

Various of the features of the invention are set forth in the following claims:

I claim:

1. A marine propulsion device comprising a propulsion assembly including a lower unit having a gear case normally submerged in water and carrying a rotatably mounted propeller, an upper unit including a powerhead shroud normally located above the water, defining an engine compartment, and including a bottom wall with a portion extending forwardly of said lower unit, said portion having therein an aperture, and an outer, marginal wall surface extending from said aperture and intersecting said aperture to form an aperture edge, an internal combustion engine for driving said propeller disposed inside said engine compartment, and a vent and drain assembly including a valve member movably disposed in said aperture for movement between a normally open position and a closed position and including a sealing portion which is disposed exteriorly of said shroud bottom wall, and which is adapted to sealingly engage said marginal wall in an area in adjacently spaced relation from said aperture edge when said valve member is in the closed position, said valve member being in the normally open position to permit ventilation of said engine compartment to the atmosphere through said aperture and to afford drainage of liquid from said engine compartment through said aperture when the water level is below said shroud bottom wall and being movable to the closed position to prevent ingress of water into said engine compartment through said aperture in response to a rise in the water level above said shroud bottom wall.

2. A marine propulsion device according to claim 1 wherein said aperture is located at a lowermost point in said shroud bottom wall.

3. A marine propulsion device according to claim 1 wherein said valve member includes a sealing portion which is disposed exteriorly of said shroud bottom wall, is adapted to sealingly engage the outer surface of said shroud bottom wall in the vicinity surrounding said aperture and is displaced outwardly from said shroud bottom wall when said valve member is in the open position.

4. A marine propulsion device comprising a propulsion assembly including a lower unit having a gear case normally submerged in water and carrying a rotatably mounted propeller, an upper unit including a powerhead shroud which defines an engine compartment and includes a bottom wall which is normally located above the water, which includes therein an aperture and which has an outer, marginal wall surface extending from said aperture and intersecting said aperture to form an aperture edge, an internal combustion engine for driving said propeller disposed inside said engine compartment, and a valve member movable through said aperture and between open and closed positions and including a hollow portion which defines a cavity for entrapped air, and a sealing portion which is disposed exteriorly of said shroud bottom wall, and which is adapted to sealingly engage said marginal wall in an area in adjacently spaced relation from said aperture edge when said valve member is in the closed position, said valve member being in a normally open position to permit ventilation of said engine compartment to the atmosphere through said aperture and to afford drainage of liquid from said engine compartment through said aperture when the water level is below said shroud bottom wall and being movable to the closed position to prevent ingress of water into said engine compartment through said aperture in response to a rise in the water level above said shroud bottom wall.

5. A marine propulsion device according to claim 4 wherein said aperture is located at a lowermost point in said shroud bottom wall.

6. A marine propulsion device comprising a propulsion assembly including a lower unit having a gear case normally submerged in water and carrying a rotatably mounted propeller, an upper unit including a powerhead shroud defining an engine compartment and having a bottom wall which is normally located above the water, which includes therein an aperture and which has an outer marginal wall surface extending from said aperture and intersecting said aperture to form an aperture edge, an internal combustion engine for driving said propeller disposed inside said engine compartment, and a valve member movable through said aperture and between open and closed positions and including a hollow portion which defines a cavity for entrapped air, a first sealing portion which is adapted to sealingly engage said aperture edge when said valve member is in the closed position, and a second sealing portion which is disposed exteriorly of said shroud bottom wall, which is adapted to sealingly engage said marginal wall in an area in adjacently spaced relation from said aperture edge when said valve is in the closed position, said valve member being in a normally open position to permit ventilation of said engine compartment to the atmosphere through said aperture and to afford drainage of liquid from said engine compartment through said aperture when the water level is below said shroud bottom wall and being movable to the closed position to prevent ingress of water into said engine compartment through said aperture in response to a rise in the water level above said shroud bottom wall.

7. A marine propulsion device comprising a propulsion assembly including a lower unit having a gear case normally submerged in water and carrying a rotatably mounted propeller, an upper unit including a powerhead shroud having a bottom wall normally located above the water and defining an engine compartment, an internal combustion engine for driving said propeller disposed inside said engine compartment, and a vent and drain assembly including an aperture in said shroud bottom wall at a low point thereof and opening said engine compartment to the atmosphere, and a valve member including a hollow, domed portion which defines a cavity for entrapped air and which movably extends through said aperture into said engine compartment, a plurality of circumferentially-spaced lugs which extend outwardly from the exterior surface of said domed portion and are adapted to rest on the inner surface of said shroud bottom wall to support said valve member thereon when said valve member is in an open position, and a flange extending laterally outwardly from said domed portion below said lugs for sealing engagement with the outer surface of said shroud bottom wall in the vicinity surrounding said aperture when said valve member is in an open position, whereby said valve member is operable to permit ventilation of said engine compartment to the atmosphere through said aperture, and to afford drainage of liquid from said engine compartment through said aperture when the water level is below said shroud bottom wall, and to prevent ingress of water into said engine compartment through said aperture in response to a rise in the water level above said shroud bottom wall.

8. A marine propulsion device according to claim 7 wherein said aperture is located at a lowermost point in said shroud bottom wall.

9. A marine propulsion device comprising a propulsion assembly including a lower unit having a gear case normally submerged in water and carrying a rotatably mounted propeller, an upper unit including a powerhead shroud having a bottom wall normally located above the water and defining an engine compartment, an internal combustion engine for driving said propeller disposed inside said engine compartment, and a vent and drain assembly including an aperture in said shroud bottom wall at a low point thereof and opening said engine compartment to the atmosphere, and a valve member movably disposed in said aperture, said valve member being operable to permit ventilation of said engine compartment to the atmosphere through said aperture and afford drainage of liquid from said engine compartment through said aperture when the water level is below said shroud bottom wall and also operable to prevent ingress of water into said engine compartment through said aperture in response to a rise in the water level above said shroud bottom wall, said valve member including a hollow portion which defines a cavity for entrapped air, which extends through said aperture into said engine compartment, and which has an outer end portion, said valve member further including a plurality of circumferentially-spaced lugs which extend outwardly from the exterior surface of said hollow portion and are adapted to rest on the inner wall of said shroud bottom wall to support said valve member thereon when said valve member is in the open position, and said valve member further including a sealing portion which is disposed exteriorly of said shroud bottom wall, which is adapted to sealingly engage the outer surface of said shroud bottom wall in the vicinity surrounding said aperture, and which is displaced outwardly from said shroud bottom wall when said valve member is in the open position, said sealing portion comprising a flange extending laterally outwardly from said outer end portion of said hollow portion.

10. A marine propulsion device according to claim 9 wherein said flange includes a first sealing section comprising a tapered surface which is adjacent said outer end portion of said hollow portion and sealingly engages the outer edge of said aperture when said valve member is in the closed position and a second sealing section comprising a peripheral lip which is spaced outwardly from said tapered surface and sealingly engages the outer surface of said shroud bottom wall beyond said aperture when said valve member is in the closed position.

11. A marine propulsion device according to claim 9 wherein said outer end portion of said hollow portion is open to the atmosphere and air is entrapped in said cavity as the water rises to the level of said outer end portion of said hollow portion.

12. A marine propulsion device according to claim 9 wherein said valve member includes a wall member extending laterally across said outer end portion of said hollow portion and cooperating with said hollow portion to define a substantially closed chamber for entrapped air.

13. A marine propulsion device according to claim 9 wherein said peripheral lip has an outer surface which is flared toward said shroud wall to serve as a splash guard for preventing water from readily splashing through said aperture into said engine compartment when said valve member is in the open position.

* * * * *